United States Patent Office 3,523,084
Patented Aug. 4, 1970

3,523,084
LUBRICATING OIL ESTER BASE COMPOSITION CONTAINING LIQUID ESTERS OF NEOALKYL POLYOLS AND NEOALKYL FATTY ACIDS
Tai S. Chao, Homewood, Ill., Manley Kjonaas, Hammond, Ind., and William D. Hoffman, Park Forest, Ill., assignors to Sinclair Research, Inc., New York, N.Y., a corporation of Delaware
No Drawing. Original application June 16, 1966, Ser. No. 557,898, now Patent No. 3,441,600, dated Apr. 29, 1969. Divided and this application Nov. 14, 1968, Ser. No. 791,828
Int. Cl. C10m 1/26
U.S. Cl. 252—56           7 Claims

ABSTRACT OF THE DISCLOSURE

Lubricating oil ester base compositions are obtained consisting essentially of a blend of (a) a minor amount of a normally liquid ester of certain neoalkyl polyols having at least three hydroxyl groups which are esterified with a selected neoalkyl fatty acid and (b) a major amount of a different ester of an alkanol and an alkane carboxylic acid. The neoalkyl polyol is pentaerythritol or a 1,1,1-trimethyolalkane of 5 to 7 carbon atoms. The neoalkyl fatty acid is 4,4-dimethylhexanoic acid, 5,5-dimethylhexanoic acid, 3,3-dimethylpentanoic acid, 3,3,4-trimethylpentanoic acid or 4,4,5-trimethylhexanoic acid. These lubricant blends of esters remain liquid at low temperatures and have improved high temperature viscosity characteristics.

---

This application is a division of application Ser. No. 557,898, filed June 16, 1966, now U.S. Pat. No. 3,441,600, issued Apr. 29, 1969.

This invention is concerned with liquid synthetic esters and with lubricant fluids which use esters as a component. Lubricants composed in whole or in part of synthetic components have been developed in an effort to obtain superior lubricating compositions having specific and unusual characteristics. In general, these lubricating compositions are characterized by higher viscosity indices, lower pour points and greater heat stability than mineral oils of corresponding viscosity. Such properties are of special value in lubricating engines which are subjected to high temperatures, such as combustion turbine engines. Mineral oil lubricants, even those containing added VI improvers, pour point depressors, or other additives are undesirable for use in such engines because of their volatility, low flash point, and tendency to leave a residue which accumulates and interferes with the operation of the engine. The provision of lubricants which are blends of diesters with more viscous natural or synthetic fluids including complex esters, polyesters and other polymers is an attractive way to obtain special properties in the lubricant derived from the properties of the ingredients. Other lubricants are composed principally of esters of monocarboxylic acids and polyhydric alcohols, the latter often having at least 3 hydroxyl groups.

Various liquid esters such as di-2-ethylhexyl sebacate, etc., have been used commercially in or as lubricants. In particular, esters of neoalkyl fatty acids and neoalkyl polyols of 3–5 hydroxyl groups such as trimethylolpropane and pentaerythritol are generally good base fluids for high temperature synthetic lubricants. They have greater thermal stability than esters of straight chain alcohols, for example, and give greater cleanliness in engine and bench scale tests than do many lubricants. However, the successful use as lubricants of these esters of neoalkyl fatty acids and neoalkyl polyols has been extremely limited, since most of them have been known to exist as solids at room temperature, this being especially true for the plural esters such as those wherein 3 or more of the hydroxyl groups of the alcohol are esterified. The physical state of lubricants, i.e., whether they are fluids or solids under standard conditions, is extremely important for lubricants such as those used in jet aircraft, since they must be able to flow and pour at sub-zero temperatures to achieve their function, especially during the critical start-up time.

It has now been found that the neoalkyl polyol esters of certain neoalkyl fatty acids having from 7 to as high as 9 carbon atoms have excellent susceptibility to amine antioxidants and the attendant advantages of ester lubricants and yet exist as liquids at normal temperatures. In acordance with the present invention, the normally liquid esters useful as lubricants, or as synthetic lubricant components, are those resulting from the esterification of a neoalkyl polyol selected from the group consisting of pentaerythritol and 1,1,1-trimethylolalkanes of 5 to 7, preferably 5 to 6, carbon atoms with one or more neoalkyl fatty acids selected from the group consisting of 3,3-dimethylpentanoic acid; 3,3,4-trimethylpentanoic acid; 4,4-dimethylhexanoic acid; 4,4,5-trimethylhexanoic acid and 5,5-dimethylhexanoic acid. The esters of the present invention are those in which at least three, preferably essentally all, of the hydroxyl groups of the polyol are esterified with the neoalkanoic acid. By use of the description "normally liquid" it is meant to include herein and in the claims those esters which may exist as "supercooled" liquids under normal conditions. As mentioned above, suitable acids are those having, at a position removed from the carboxyl group by at least one secondary carbon atom, a neoalkyl structure, i.e., a carbon atom bonded directly to 4 other carbon atoms and represented thusly:

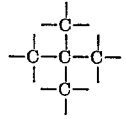

Similarly, the polyols are characterized by having such a neoalkyl structure. Preferred polyols are pentaerythritol (PE) and trimethylolpropane (TMP). Polyols having more than 4 hydroxyl groups and/or more than 7 carbon atoms usually produce esters with the present acids which are high melting solids and, therefore, not of the present invention. Similarly, with respect to the acid component, normally solid esterification products also result when the alkanoic acid contains a neo-carbon atom adjacent the carboxyl group, that is, when the alkanoic acid is 2,2,2-trialkyl-substituted, thus forming what is commonly referred to as a "neo-acid." For example, the 2,2-dimethylpentanoic acid (a neo-acid) tetraester of pentaerythritol is a high melting solid (M.P.: 189–192° F.), whereas the 3,3-dimethylpentanoic acid tetraester of pentaerythritol exists either as a supercooled liquid or as a low melting solid at room temperature and, in its liquid state, is a preferred lubricant of the present invention.

Some of the acids used in the preparation of the esters of this invention are commercially available, while others can be prepared according to known methods. For example, 3,3-dimethylpentanoic acid can be prepared from 3,3-dimethylpentanol by oxidation with potassium permanganate and 5,5-dimethylhexanoic acid can be prepared by free radical addition of acetic acid to 3,3-dimethylbutene-1.

The following example shows a procedure for the preparation of 5,5-dimethylhexanoic acid.

EXAMPLE I

A five liter, four-necked flask was fitted with two reflux condensers, a mechanical stirrer and a thermometer. The flask was charged with 2,860 ml. (50 moles) of glacial acetic acid, 84 g. (1 mole) of neohexene and 36.3 (0.15 mole) of benzoyl peroxide. After heating for 24 hours at 90° C., an aliquot showed that all of the peroxide had been consumed. The mixture was then distilled to remove excess acetic acid. No unreacted neohexene was detected. The residue in the flask was washed with water to remove any remaining acetic acid and then extracted with aqueous $K_2CO_3$. The extract was acidified, whereupon an organic layer separated, and was washed and dried. The crude 5,5-dimethylhexanoic acid was distilled to remove a small amount of forerun. The bulk of the product distilled at 125° C. It first appeared as a colorless liquid, but solidified on standing. Melting point, 37–39° C.; yield, 91.7 grams, or 64% of theory.

*Analysis.*—Calc'd for $C_8H_{10}O_2$ (percent): C, 66.62; H, 11.8. Found (percent): C, 66.57; H, 11.0.

The esters of the neoalkanoic acids of this invention can be prepared by more or less conventional methods of esterification. Slightly more than the stoichiometric amount of the acid may be used and the esterification may be carried out by refluxing the reactants in an azeotroping solvent such as toluene or xylene until no more water of reaction is obtained. The excess acid and solvent can then be removed under vacuum. The crude ester can be washed with aqueous sodium carbonate and water until free of water-soluble impurities and distilled under vacuum, preferably in the presence of a small amount of anhydrous potassium carbonate, to remove the last traces of solvent and water. The ester can then be filtered through a filter aid like Hyflo Super-Cel to remove the inorganic salts. Esterification catalysts may be employed to speed the reaction, although this is often unnecessary. Since they are not as sterically hindered as the neo-acids, no drastic conditions such as, for instance, the use of relatively high percentages of sulfuric acid catalyst or a conversion to the acid chloride are needed. In fact, in the preparation of these esters for use in synthetic lubricants, the use of sulfuric acid, p-toluene sulfonic acid or other sulfur-containing catalysts should be avoided, as even a trace of sulfur in the finished product will often result in deterioration of the quality thereof.

Preparation of the novel esters of the present invention will be better understood by reference to the following examples which should be considered illustrative only and not limiting.

EXAMPLE II

This example shows the preparation of trimethylolpropane tris(5,5-dimethylhexanoate). A mixture of 54 g. (0.40 mole) of trimethylolpropane, 180 g. (1.25 moles) of 5,5-dimethylhexanoic acid and 100 g. of xylene was charged into a liter, 4-necked flask equipped with mechanical stirrer, thermometer, reflux condenser and a Dean-Stark azeotrope trap. The mixture was stirred and refluxed for a period of 28 hours during which 20 cc. of water was collected in the trap, the pot temperature being 161–169° C.

The reaction mixture was stripped under vacuum (to 180° C. at 1 mm. Hg) to remove xylene and unreacted acid. The residue was diluted with hexane and washed three times with a 5% aqueous solution of $Na_2CO_3$ and once with water. It was then topped to 130° C. at 1 mm. Hg and filtered through Hyflo Super-Cel to give 190 g. of a light yellow, viscous liquid having the following properties:

KV at 210° F.—6.828 cs.
KV at 100° F.—65.64 cs.
Pour point——25° F.
Flash point—475° F.
Sap. No.—319.7
Acid No.—0.08
Hydroxyl No.—22.4

EXAMPLE III

This example illustrates the preparation of pentaerythritol tetrakis(3,3-dimethylpentanoate). A mixture of 38 g. (0.265 mole) of pentaerythritol, 160 g. (1.21 moles) of 3,3-dimethylpentanoic acid and 60 ml. of xylene was stirred at reflux temperature (167–210° C.) for 32 hours in a 4-necked flask equipped with reflux condenser and Dean-Stark trap. A total of 21.0 ml. of water was collected in the trap. The reaction mixture was topped to 175° C. at 1 mm. Hg pressure. The residue was diluted with xylene and washed twice with a 5% aqueous solution of $Na_2CO_3$ and twice with water. The washed ester was topped to 165° C. at 1 mm. Hg pressure, leaving 144 g. of a viscous liquid having the following properties:

KV at 210° F.—14.91 cs.
KV at 100° F.—277 cs.
Pour point——10° F.
Sap No.—338.7

That the ester thus prepared existed as a supercooled liquid at ambient temperatures was evidenced by treating a later liquid sample, prepared from a heart cut of 3,3-dimethylpentanoic acid, with a few broken crystals of pentaerythritol tetrakis(neoheptanoate). The seeding of the sample resulted in its solidification when cooled to about 20° F. The solid melted at 80–82° F.

A number of other esters were made using this same general procedure and are reported in the tables below. In Table I the viscosity characteristics and other observations made on a number of samples are reported; included therein for comparison purposes are esters of so-called neo-acids having the same number of carbon atoms as those of the present invention, and which were found to be solids at room temperatures.

TABLE I.—PHYSICAL PROPERTIES OF TRIMETHYLOLPROPANE (TMP) TRI- AND PENTAERYTHRITOL (PE) TETRA-ESTERS OF BRANCHED CHAIN ACIDS

| Sample | Polyol | Acid | Kinematic viscosity, centistokes | | Pour point, °F. | Flash point, °F. | Physical state of ester | Melting point, °F. |
|---|---|---|---|---|---|---|---|---|
| | | | 210° F. | 100° F. | | | | |
| 374 | TMP | 4,4-dimethylhexanoic | 9.042 | 103.7 | −35 | 465 | Liquid | |
| 426 | TMP | 4,4,5-trimethylhexanoic | 13.97 | 226.7 | | | Liquid | |
| 375 | PE | 4,4-dimethylhexanoic | 17.01 | 340.3 | −10 | 530 | Liquid | |
| 220 | PE | 5,5-dimethylhexanoic | 11.16 | 169.3 | 5 | 480 | Liquid | |
| 425 | PE | 4,4,5-trimethylhexanoic | 28.75 | 959.3 | 20 | | Liquid | |
| 025 | PE | 3,3-dimethylpentanoic | 14.91 | 277.0 | −10 | | Liquid [1] | |
| 700 | PE | 3,3-dimethylpentanoic | 15.09 | 273.2 | −20 | 490 | Liquid [1] | 80–82 |
| 006 | PE | 2,2-dimethylbutyric | | | | | Solid | 300–310 |
| 007 | PE | 2,2-dimethylpentanoic | | | | 440 | Solid | 189–192 |
| 005 | PE | 2,2-dimethylpropanoic | | | | | Solid | 258–260 |
| 003 | TMP | 5,5-dimethylhexanoic | 6.828 | 65.64 | −25 | 475 | Liquid | |
| 238 | TMP | 4,4-dimethylpentanoic | 8.162 | | | | Solid | |
| 239 | PE | 4,4-dimethylpentanoic | 15.84 | | | | Solid | 167–172 |
| | PE | 2,2-dimethylhexanoic | 13.19 | | | 470 | Solid | 149–153 |
| 669 | DPE [2] | 3,3-dimethylpentanoic | 47.40 | | | | Solid | 189–192 |

[1] Supercooled.
[2] Dipentaerythritol.

A perusal of Table I shows that the neoalkyl fatty acids of this invention give esters with neoalkyl polyols having favorable viscosity properties, whereas nearly homologous or isomeric acids yield esters which exist only as solids at room temperature.

A number of normally liquid esters were prepared and tested for oxidation resistance and antioxidant susceptibility by a standard test called the Oxygen Absorption Test. In this test, a 75 gm. sample of the ester containing a standard antioxidant is oxidized at 450° F. with 1 ft.³/hr. of oxygen in a tube about 9" long and 1¼" in I.D. The exit gas passes through a reflux condenser, an entrainment trap and two absorption tubes. The first tube is filled with active charcoal, Drierite and Ascarite to remove organic vapor, water and $CO_2$. The gases come out from the first tube then pass through a catalytic oxidation tube filled with CuO, in which CO and hydrocarbons are converted to $CO_2$. The exit gas from the oxidation tube then passes through a second absorption tube filled with Drierite and Ascarite and is circulated with a tubing pump back into the sample tube. Thus oxygen is continuously circulated through the system until it is used up by the sample. The decrease in volume of oxygen in the system, which represents the volume of $O_2$ absorbed, is continuously measured by a Statham gauge and recorded on a Brown recorder. The recorder is so calibrated that the slope of the curve represents the rate of oxygen absorption. During the earlier part of the test, oxidation of the oil is effectively inhibited by the antioxidant and the rate of $O_2$ absorption is usually small. The rate usually stays constant until a time is reached at which the inhibitor is either exhausted or is no longer effective. At this point, there is generally a fast increase in the rate of oxidation. The time in minutes required for this change in rate to happen is called the induction period ($T_i$). The volume of $O_2$ absorbed during this period of time is represented by $V_i$. The test is continued until a total volume ($V_t$) of 2500 ml. of $O_2$ has been absorbed. The time in minutes for this to take place is called the total time ($T_t$). A good base fluid for lubricant should exhibit a high $T_i$ value (i.e., a long induction period), a high $T_t$ value (i.e., a long period for total absorption) and little increase in acid number and viscosity as a result of the oxygen absorption.

Table II shows the $O_2$ Absorption Test results on the neoalkyl polyol esters of neoalkyl fatty acids of this invention. Results on esters of straight-chain and monoalkyl-substituted fatty acids are included for purposes of comparison. The same concentration (1% by wt.) of the same PAN antioxidant (N-phenyl-$\alpha$-naphthylamine) was used in all cases.

TABLE II

| | Sample No. | | | | | | | | |
|---|---|---|---|---|---|---|---|---|---|
| | 635 | 448 | 660 | 410 | 409 | 553 | 277 | 085 | 701 |
| Acid | Valeric | Isovaleric | Caproic | 4-methyl-pentanoic | 2-methyl-pentanoic | n-Heptanoic | | 3,3-dimethylpentanoic | |
| Number of C atoms | 5 | 5 | 6 | 6 | 6 | 7 | 7 | 7 | 7 |
| Polyol | PE | PE | PE | PE | PE | TMP | PE | PE | PE |
| $O_2$ absorption: | | | | | | | | | |
| Induction time (min.), $T_i$ | 358 | 2,371 | 260 | 322 | 175 | 239 | 156 | 528 | 733 |
| Total time (min.), $T_t$ | 413 | 2,392 | 298 | 350 | 201 | 278 | 202 | 581 | 772 |
| Induction volume (ml.), $V_i$ | 346 | 1,712 | 474 | 985 | 705 | 614 | 307 | 717 | 1,360 |
| Total volume (ml.), $V_t$ | 2,500 | 2,500 | 2,500 | 2,500 | 2,500 | 2,500 | 2,500 | 2,500 | 2,500 |
| Used oil properties: | | | | | | | | | |
| KV at 100° F. (cs.) | 24.67 | 50.74 | 28.77 | 40.48 | 33.36 | 20.49 | 35.94 | 311.0 | |
| Percent increase over original | 39.8 | 16.4 | 43.95 | 18.85 | 38.6 | 32.7 | 52.3 | 16.9 | 8.33 |
| Acid No.[1] | 12.08 | 9.99 | 8.85 | 6.64 | 10.27 | 9.81 | 7.64 | 20.38 | |
| Increase over original | | 9.90 | 8.84 | 6.09 | 10.22 | 9.75 | 7.63 | 20.33 | 9.39 |
| n-Pentane insolubles | 0.314 | 0.019 | 0.048 | 0.095 | 0.140 | 0.088 | 0.055 | 0.693 | |

| | Sample No. | | | | | | |
|---|---|---|---|---|---|---|---|
| | 370 | 278 | 583 | 412 | 411 | 233 | 467 |
| Acid | caprylic | | 2-ethylhexanoic | 4,4-dimethylhexanoic | | 5,5-dimethyl-hexanoic | 4,4,5-trimethyl-hexanoic |
| Number of C atoms | 8 | 8 | 8 | 8 | 8 | 8 | 9 |
| Polyol | TMP | PE | TMP | TMP | PE | PE | TMP |
| $O_2$ absorption: | | | | | | | |
| Induction time (min.), $T_i$ | 208 | 71 | 131 | 309 | 271 | 332 | 159 |
| Total time (min.), $T_t$ | 250 | 112 | 165 | 351 | 330 | 368 | 212 |
| Induction volume (ml.), $V_i$ | 486 | 345 | 448 | 486 | 524 | 1,200 | 449 |
| Total volume (ml.), $V_t$ | 2,500 | 2,500 | 2,500 | 2,500 | 2,500 | 2,500 | 2,500 |
| Used oil properties: | | | | | | | |
| KV at 100° F. (cs.) | 25.47 | 45.39 | 37.58 | 126.2 | 432.2 | 248.8 | |
| Percent increase over original | 38.1 | 60.6 | 22.9 | 21.8 | 32.8 | 45.2 | 22.9 |
| Acid No.[1] | 12.45 | 7.00 | 13.64 | 12.64 | 10.82 | 14.1 | |
| Increase over original | 12.45 | 6.99 | 13.52 | 12.49 | 10.61 | 14.0 | 9.26 |
| n-Pentane insolubles | 0.052 | 0.030 | 0.120 | 0.210 | 0.077 | 0.057 | |

[1] Acid number prior to $O_2$ absorption was about zero in all samples.

It can readily be seen from Table II that the esters of the present invention exhibit a combination of advantageous properties not found in any one of those esters prepared from straight chain or mono-substituted acids. Thus, the esters of the present invention (Sample Nos. 085, 412, 411 and 233) compare favorably with those esters prepared from 5 and 6 carbon atoms (Sample Nos. 635, 448, 660, 410 and 409) as regards oxidation resistance and acid number increase, yet the esters of the present invention, by virtue of their much lower volatility, find utility in extreme temperature-low pressure applications for which the lower molecular weight esters are unsuited. On the other hand, those unbranched and mono-substituted acid esters having the same carbon atom content as the neoalkyl esters of the present invention (Sample Nos. 553, 277, 370, 278 and 583), while possessing the requisite property of low volatility are markedly inferior to the neoalkyl esters of this invention in oxidation resistance properties.

The ester lubricants of this invention are useful per se as lubricants or in admixture with other synthetic ester lubricants. When incorporated, for example, in a base lubricant made up of polyol esters of straight chain or mono-branched alkanoic acids, the esters of the present invention impart high temperature viscosity characteristics to the base lubricant which were heretofore attained primarily through the use of polymeric thickeners such as polyalkylene ethers, polyesters and the like. Replacement of these conventional thickening agents with the present esters obviates problems existing with the use of the former as a result of their poor resistance to oxidation, instability to mechanical shear and low compatibility with the base lubricants.

Pentaerythritol tetra-esters of the present invention were blended in various proportions with commercially available synthetic ester base lubricants and the variations in the high temperature viscosity characteristics of the resultant blends, as compared with the unmodified base lubricants, were noted. Results are given in Table III. The commercial fluids are well-known high temperature base fluids; lubricant A is the pentaerythritol ester of a mixture of straight-chain fatty acids ranging from $C_5$ to $C_{10}$ with the average molecular weight approximating that of a $C_6$ acid, while lubricant B is the pentaerythritol ester of a similar mixture of straight-chain fatty acds but with the average molecular weight approximating that of a $C_5$ acid.

TABLE III

| Sample No. | Ester additive | | Base lubricant | Weight percent | Kinematic viscosity, centistokes | | |
|---|---|---|---|---|---|---|---|
| | Polyol | Acid | | | 210° F. | 100° F. | −40° |
| 045 | Pentaerythritol | 5,5-dimethylhexanoic | A | 16 / 82 | 4.914 | 26.41 | 12,030 |
| 027 | Pentaerythritol | 5,5-dimethylhexanoic | A | 20 / 80 | 5.082 | 26.91 | 13,099 |
| 450 | Pentaerythritol | 5,5-dimethylhexanoic | A | 25 / 75 | 5.231 | 29.46 | 18,493 |
| 416 | Pentaerythritol | 4,4-dimethylhexanoic | A | 15 / 85 | 4.980 | 26.57 | 10.605 |
| 044 | Pentaerythritol | 4,4-dimethylhexanoic | A | 20 / 80 | 5.204 | 29.48 | 14,573 |
| 028 | Pentaerythritol | 5,5-dimethylhexanoic | B | 25 / 75 | 4.755 | 25.93 | 15,263 |
| 026B | | | A | 100 | 4.252 | 20.63 | 4,708 |
| 687 | | | B | 100 | 3.804 | 17.44 | 3,506 |

Thus, from the results presented in Table III, it can be readily seen that the addition of minor amounts, e.g., from about 5 to 30 wt. percent or more, of an ester of the present invention, i.e., a neoalkyl polyol ester of a neoalkyl fatty acid, to a different synthetic ester base lubricant, i.e., one not prepared from a neoalkyl fatty acid of the present invention, for example, one made up of straight-chain or monoalkyl-substituted alkanoic acids, there results a significant improvement in the high temperature viscosity characteristics of the lubricant. The synthetic ester lubricants which may be thickened by the addition of an ester of the present invention can be made up of simple esters or compounds having multiple ester groupings, such as complex esters, polyesters or diesters. These esters are made from mono- and polyhydroxy alkanols and alkane carboxylic acids, alkanols and acids often having about 4 to 12 carbon atoms each.

The present esters also find utility in blends with non-ester base lubricants such as bis(phenoxy-phenoxy)benzene, other polyphenylethers, super-refined mineral oils, silicone-containing fluids and fluorine-containing fluids. The esters of the present invention can be used singly or in various combinations. Thus, for instance, suitable blends may be obtained by esterifying a mixture of two or more of the acids selected from the group comprising 3,3-dimethylpentanoic acid, 3,3,4-trimethylpentanoic acid, 4,4-dimethylhexanoic acid, 4,4,5-trimethylhexanoic acid and 5,5-dimethylhexanoic acid with one or more neoalkyl polyols. Similarly, a mixture of two or more neoalkyl polyols may be used to esterify a single one of the above acids, or, if desired, separately prepared esters may be subsequently blended rather than formed in situ.

It is claimed:
1. A lubricating oil composition consisting essentially of a blend of a minor amount sufficient to enhance the high temperature viscosity and up to about 30 weight percent of the composition of:
   (a) a normally liquid ester of a neoalkyl polyol selected from the group consisting of pentaerythritol and 1,1,1-trimethylolalkanes of 5 to 7 carbon atoms, wherein at least three of the hydorxyl groups of the polyol are esterified with neoalkyl fatty acid selected from the group consisting of 3,3-dimethylpentanoic acid, 3,3,4-trimethylpentanoic acid; 4,4-dimethylhexanoic acid; 4,4,5-trimethylhexanoic acid and 5,5-dimethylhexanoic acid; and
   (b) a major amount of a different ester of an alkanol of about 4 to 12 carbon atoms and a straight chain or monoalkyl substituted alkanolic acid of about 4 to 12 carbon atoms.

2. A lubricating oil composition of claim 1 wherein the neoalkyl polyol is pentaerythritol and is tetra-esterified with the neoalkyl fatty acid.

3. A lubricating oil composition of claim 1 wherein the different ester is the pentaerythritol ester of a mixture of straight-chain fatty acids ranging from $C_5$ to $C_{10}$ with the average molecular weight approximating that of a $C_6$ acid.

4. A lubricating oil composition of claim 1 wherein the different ester is the pentaerythritol ester of a mixture of straight chain fatty acids ranging from $C_5$ to $C_{10}$ with the average molecular weight approximating that of a $C_5$ acid.

5. A lubricating oil composition of claim 1 wherein the neoalkyl polyol is pentaerythritol and the neoalkyl fatty acid is 5,5-dimethylhexanoic acid and the pentaerythritol is tetra-esterified with said acid.

6. A lubricating oil composition of claim 1 wherein the neoalkyl polyol is pentaerythritol and the neoalkyl fatty acid is 4,4-dimethylhexanoic acid and the pentaerythritol is tetra-esterified with said acid.

7. A lubricating oil composition of claim 1 wherein the neoalkyl polyol is pentaerythritol and is tetra-esterified with the neoalkyl fatty acid, the neoalkyl fatty acid is selected from the group consisting of 5,5-dimethylhexanoic acid and 4,4-dimethylhexanoic acid, and the different ester is the pentaerythritol ester of a mixture of straight chain fatty acids ranging from $C_5$ to $C_{10}$ with the average molecular weight approximating that of a $C_5$ or $C_6$ acid.

References Cited

UNITED STATES PATENTS

| 2,958,706 | 11/1960 | Hurwitz et al. | 252—56 X |
| 2,991,297 | 7/1961 | Cooley et al. | 260—410.6 |
| 3,049,493 | 8/1962 | Young et al. | 252—56 |
| 3,115,519 | 12/1963 | Crouse et al. | 252—56 X |
| 3,308,155 | 3/1967 | Lundeen | 252—56 X |
| 3,309,318 | 3/1967 | Aylesworth et al. | 252—56 |
| 3,441,600 | 4/1969 | Chao et al. | 260—488 |

DANIEL E. WYMAN, Primary Examiner

W. CANNON, Assistant Examiner